US012808404B2

(12) United States Patent
Underwood

(10) Patent No.: US 12,808,404 B2
(45) Date of Patent: Nov. 24, 2026

(54) OPEN LOOP CONNECTOR

(71) Applicant: UNDERWOOD COMPANIES HOLDINGS PTY LTD, Brisbane (AU)

(72) Inventor: Daniel Charles Underwood, Brisbane (AU)

(73) Assignee: UNDERWOOD COMPANIES HOLDINGS PTY LTD, Brisbane (AU)

( * ) Notice: Subject to any disclaimer, the term of this patent is extended or adjusted under 35 U.S.C. 154(b) by 0 days.

(21) Appl. No.: 18/016,349

(22) PCT Filed: Jul. 15, 2021

(86) PCT No.: PCT/AU2021/050757
§ 371 (c)(1),
(2) Date: Jan. 15, 2023

(87) PCT Pub. No.: WO2022/011423
PCT Pub. Date: Jan. 20, 2022

(65) Prior Publication Data

US 2023/0272816 A1 Aug. 31, 2023

(30) Foreign Application Priority Data

Jul. 15, 2020 (AU) ................................ 2020902445

(51) Int. Cl.
*F16B 45/02* (2006.01)
*F16B 5/06* (2006.01)

(52) U.S. Cl.
CPC .......... *F16B 45/035* (2021.05); *F16B 5/0692* (2013.01)

(58) Field of Classification Search
CPC ........ F16B 45/035; F16B 5/0692; F16B 2/08; F16B 21/088; B65D 63/1027
See application file for complete search history.

(56) References Cited

U.S. PATENT DOCUMENTS 877,634 A * 1/1908 Decker ................ A01K 15/003 119/866
1,209,083 A * 12/1916 Wagner, Jr. ........... F16B 45/035 24/598.2

(Continued)

FOREIGN PATENT DOCUMENTS

AT 14102 U1 4/2015
AU 148870 S 8/2002

(Continued)

*Primary Examiner* — David M Upchurch
(74) *Attorney, Agent, or Firm* — Bonini IP Law, LLC; Frank J. Bonini, Jr.

(57) ABSTRACT

An open loop connector 10 (to enlarged scale) having a leading end 11 and a trailing end 12 joined by a loop body part 13. A hook point portion 18 includes a sharp point 19 with an inward curve 20 so that with a downward stroke the point 19, which is projecting out from the loop, catches sheet material and its curve gives it reentrant function through the sheet. The trailing end 12 has an enlargement 21 which has a narrow slot 22. The hook point portion 18 faces the slot 22. The hook point portion 18 has an enlargement attachment as narrow outwardly facing relieved sections 23 and 24 matched to the slot 22 so that this narrow section may pass closely through the slot 22. The enlargement has an undercut 25 providing a shoulder 26 so that the hook portion may manually be extended to align the narrow relieved sections with the slot, the narrow section 23, 24 may then be pushed through the slot 22 and released back into the slot 22, the shoulder region 26 locks under shoulder 25 thereby closing the loop. The reverse process unlocks and opens the loop. By reason of the configuration of the hook, the curve of the loop and the slot 22, the back of the recesses 23 and 24 at 27 is inclined to the curved line of the loop. This aids entry into slot 22.

12 Claims, 13 Drawing Sheets

(56) References Cited

U.S. PATENT DOCUMENTS 1,851,220 A 3/1932 Tarbox
1,957,728 A * 5/1934 Rachel ................ A01K 15/003 119/866
2,423,455 A 7/1947 Larson
2,881,762 A * 4/1959 Lowrie ................ A61B 17/068 29/564
2,900,692 A 8/1959 Lincoln
3,032,305 A 5/1962 Mittenzwei
3,204,636 A * 9/1965 Kariher ................ A61B 17/122 24/562
3,661,693 A 5/1972 Pierson
3,685,663 A 8/1972 Hoeffleur
3,805,439 A * 4/1974 Krengel ................ A01K 95/00 43/43.1
3,816,885 A 6/1974 Saether
4,180,247 A 12/1979 Pfarr, Jr.
4,236,688 A 12/1980 Wilk
4,275,484 A 6/1981 Irio et al.
4,308,637 A * 1/1982 Kucera .................... A47K 3/38 16/93 D
4,412,368 A * 11/1983 Springer .................. A44B 9/12 24/708.5
4,499,635 A 2/1985 Ward
4,773,130 A * 9/1988 Millar ...................... A44B 9/12 24/708.5
4,854,014 A 8/1989 Ueno
4,881,301 A * 11/1989 Sweeney ............... F16L 33/035 24/30.5 R
4,924,558 A 5/1990 Calmettes et al.
4,935,992 A * 6/1990 Due ...................... F16L 33/035 24/20 TT
4,991,265 A 2/1991 Campbell et al.
5,216,784 A * 6/1993 Dyer ..................... F16L 33/035 24/20 R
5,333,361 A * 8/1994 Schaede ................. A44B 99/00 24/30.5 R
5,367,742 A * 11/1994 Bindman ............... A47H 13/02 16/87.2
5,465,596 A 11/1995 Park
5,543,196 A 8/1996 Robinson et al.
5,547,322 A 8/1996 Lilja et al.
5,729,870 A 3/1998 Sharp
5,787,954 A * 8/1998 Herrera .................... A47K 3/38 160/DIG. 6
5,920,968 A * 7/1999 Anscher ................ F16B 45/035 24/598.2
5,937,488 A * 8/1999 Geiger .................. F16L 3/1033 24/339
5,940,944 A * 8/1999 Anscher ................ F16B 45/036 24/265 AL
D425,127 S 5/2000 Mackey
6,125,657 A * 10/2000 Esposito ............... F16B 45/035 63/7
6,773,036 B1 * 8/2004 King ..................... F16L 47/345 285/5
6,823,565 B2 11/2004 Toye
6,845,644 B1 1/2005 Buckner
8,713,763 B2 * 5/2014 Koketsu ................ F16L 33/035 24/273
9,605,791 B2 3/2017 Howlett et al.
9,810,256 B2 * 11/2017 Blizzard ................. F16B 45/04
10,244,832 B2 * 4/2019 Kakadiya ............... A44C 7/003
10,823,761 B2 * 11/2020 Stachowiak, Jr. ..... G01R 11/24
2005/0024116 A1 2/2005 Florescu
2006/0167480 A1 * 7/2006 Loshakove ............ A61B 17/11 606/151
2009/0177277 A1 * 7/2009 Milo ..................... A61F 2/2445 623/2.36
2010/0299892 A1 * 12/2010 Ardern ...................... F16B 2/08 24/481
2015/0166236 A1 6/2015 Comaniuk et al.
2015/0321814 A1 11/2015 Rodrigues Pereira
2016/0359226 A1 * 12/2016 Dundorf .................. H01Q 1/42
2018/0201421 A1 7/2018 Vorhis
2019/0053795 A1 * 2/2019 Asfora ................... A61B 17/06

FOREIGN PATENT DOCUMENTS

CZ 279632 B6 5/1995
FR 1046983 A 12/1953
FR 2925630 A1 6/2009
GB 2327455 A 1/1999
JP S583296 U 1/1983
JP 2001020913 A 1/2001
WO 2022011423 A1 1/2022

* cited by examiner

OPEN LOOP CONNECTOR

TECHNICAL FIELD

THIS INVENTION relates to open loop connectors and in particular but not limited to an open loop connector adapted to pass through and return through a sheet material and having a pointed leading end followed by a trailing end.

BACKGROUND

Loop connectors are extremely common. A keyring is an example of a loop connector. A chain link is an example of a loop connector. Loop connectors may be integrally formed or may be made from parts. A common two part loop connector comprises half circle parts hinged together and having slide by clip sections so the parts hinge to a loop. Curtain fittings often employ all manner of loops. Various bent wire and spring wire connectors are also known. Connectors with sharp points are also well known in building and construction. The art is clearly a crowded and mature art.

The following are non-exhaustive examples of connectors involving some form of open loop: U.S. Pat. No. D425,127 (Mackey); U.S. Pat. No. 9,605,791B2 (Howlett et al); U.S. Pat. No. 6,823,565B2 (Toye); U.S. Pat. No. 5,729,870 (Sharp); U.S. Pat. No. 5,547,322 (Lilja et al); U.S. Pat. No. 5,543,196 (Robinson et al); U.S. Pat. No. 5,465,596 (Park); U.S. Pat. No. 4,499,635 (Ward); U.S. Pat. No. 4,236,688 (Wilk); U.S. Pat. No. 4,180,247 (Pfarr); U.S. Pat. No. 3,816,885 (Saether); U.S. Pat. No. 3,661,693 (Pierson); U.S. Pat. No. 3,032,305 (Mittenzwei); U.S. Pat. No. 2,900,692 (Lincoln); U.S. Pat. No. 2,423,455 (Larson); U.S. Pat. No. 1,851,220 (Tarbox).

The Applicant's invention should be viewed through the lens of a crowded art in order to demonstrate that in all the circumstances the notional skilled person would be presented with many similar solutions to the present invention. Since the present invention arises in a crowded art it would be prima facie wrong to suggest that there was, or is, apart from the very general problem of providing an open loop connector, or that there was any a particular problem or motivation extant at the filing date of the present application that would give rise to the non-inventive notional person coming up with the present invention either in idea, concept or practical form. Thus the recognition and the present conception may be considered as whole or part of Applicant's inventive step.

With this and the other background factors, including as set out above, in mind, it should be clearly appreciated to the reader, that it is elementary that exercise of the inventive faculty in all the circumstances, in such a crowded art, is likely to be present in small variations. This is a background observation in hindsight only and is not to say that any of Applicant's new features whether individually or in combination are in any way slight or small. All that is required is a "scintilla" of invention.

Outline

In one aspect there is provided an open loop connector formable into a closed loop, a connection comprising an enlargement and a second part comparing an enlargement attachment, the parts being engageable to close the loop, the parts being so dimensioned and arranged so that they are manually moveable in a controlled manner with the second part moved in a forward direction over the first part, then down into the enlargement and then reversed to engage the parts and close the loop.

Preferably, the loop comprises a self holding loop body configuration having opposed confronting ends when in a first and open loop position, the enlargement is at or adjacent one end, the ends being aligned for closure but the loop configuration resisting them being brought together, the loop being manually operable by a user to overcome the resistance to bring the enlargement attachment to a pre-engagement position where it then retracts to engage the enlargement and close the loop.

Preferably, the open loop has an end opposite the enlargement that may pass through a hole in sheet material. Preferably, a pointed end portion that has a point that creates its own entry hole. This may be caused by swing movement of the user's hand. Typically, the pointed end portion is operable to pass through and automatically return through the sheet material due to the configuration of the pointed end portion. This may comprise a sharp hooked end. This may hook back toward the enlargement.

Preferably, the loop is non-circular in shape having a hook shaped leading end and the enlargement being an enlarged trailing end, the leading end having an outwardly facing shoulder, the trailing end having a corresponding shoulder lockable behind the outwardly facing shoulder to close the loop. Typically, the enlargement is a slotted enlargement adapted to be disposed in a straddling relationship over the enlargement attachment to close the loop.

Preferably, the attachment has at least one outwardly facing relieved or wasted section, the enlargement having a gap, the relieved or wasted section being moveable under manual pressure to enter the gap so that the relieved section may pass through the gap and upon retraction into the gap, engage the enlargement to releasably close the loop. In a variable sized loop embodiment, there are enlargement attachments typically relieved or wasted sections spaced along the loop, so that the loop may be closed tighter by selection of an inner one of the relieved sections to engage. In one embodiment the connector has inward and outward directed sections along the connector. Enlargement attachments may be provided on each outward section. In one example, the inward and outward directed sections along the connector provide zig-zag form.

There are various possible enlargements in one case the enlargement is a slotted head and the attachment is tapered so as to wedge in the slot. In another, the enlargement is a head having a recess around an opening, the attachment is a wasted section having a shoulder including a leading face which, when the loop is closed, is in register with a back wall of the recess.

Having regard to the above there are various additional preferments that may include or modify the above.

An option in the present invention is to employ a closeable loop that is self holding in its open position. Broadly, in one preferred aspect there is provided an open loop connector comprising a self holding loop body configuration having opposed confronting ends when in a first and open position, an enlargement at or adjacent one end, at least one enlargement attachment used to engage the enlargement to close the loop, the ends being aligned for closure but the loop configuration resisting them being brought together, the loop being manually operable by a user to overcome the resistance to bring the enlargement attachment to a pre-engagement position where it then retracts to engage the enlargement and close the loop.

Opposite ends of the open loop may be adapted to be manually connected. This may be by slide or clip action. A detent may be employed to resist disconnection. Typically, the open loop has an end that may pass through a hole in sheet material. The end may be adapted to penetrate the sheet material. There are applications where features of the loop may be used and the point is not required so in these applications the loop would not have the point.

Preferably, where there is a point, the pointed end portion is operable to pass through and automatically return through the sheet material during the swing movement due to the configuration of the pointed end portion. This is of course an ideal action in the case of a flat sheet held sufficiently taut so that the pointed end follows an in and out path determined by the configuration of the point and the swing movement. Additional manual manipulation may be required in other circumstances. In other applications of the invention the same loop may be used without passing back through or even without sheet material.

The loop may be used in situations where it remains open. In this situation, features of the loop may be utilised so that there is no need to have any connection to close the loop.

Preferably, the pointed end comprises a sharp hooked end. The hook may be slight or more pronounced. Typically, the pointed end hooks back slightly toward the user swing movement and toward the direction of the return though the sheet material.

Preferably, the loop is non-circular in shape having a hook shaped leading end and an enlarged trailing end, the leading end having an outwardly facing shoulder, the trailing end having an enlargement defining a shoulder lockable behind said hook shaped end shoulder to close the loop. Preferably, the loop may be releasably closed.

In another embodiment, at or adjacent the trailing end is a slotted enlargement adapted to be disposed in straddling relationship over the pointed end portion to close the loop. This straddling relationship is preferably releasable.

Preferably, the leading end has at least one outwardly facing relieved or wasted section, the trailing end having a gap, the leading end being opposed the trailing end to face it and under manual pressure enter the gap in the trailing end so that the relieved section may pass through the gap and upon retraction into the gap, engage the trailing end to releasably close the loop. There may be separate spaced relieved sections along the leading end so that the loop may be closed tighter by selection of an inner one of the relieved sections to engage the trailing end.

Typically, in the closable loop embodiment, the loop has a neutral position with the leading end on an approximate spiral to be positioned outside and arcuately overlapping the trailing end, where the leading end has a point, the point is spaced apart from the trailing end so that during the swing movement of the hand the sheet material slides adjacent the trailing end and the outward position of point ensures entry of the point through the sheet material while the hook point form ensures its automatic return. This all happens ostensibly while in the neutral position although there will be some reaction force against the penetration.

The body is typically made from a resilient material so that the loop is biased to the neutral position but the body may be resiliently bendable, openable and twistable so that various rods, bars and other bodies may pass between the ends as the loop is manually located in its operative position.

Preferably, in order to connect the ends, the ends are adapted to the releasably engaged. The process involves first the ends being manually extended to overlap further and then retract to engage. Release may be by the reverse process. Thus, there is the open loop neutral position of the leading end spaced from the trailing end, manual extension of the leading end over the trailing end, allow the leading end to retract to engage the trailing end, the loop is then closed, then to release, there is manual extension out of the trailing end followed by allowing retraction to the open loop neutral position.

It should be appreciated that although the closeble loop embodiment employing a point involves the point being moved into position in order to close the loop that the point itself is unique as is the closure. While the example herein shows these in operative combination Applicant reserves the right to claim these as separate inventions.

Thus there is provided a hook point portion comprising a sharp point and a short inward arc just inboard of the sharp point directing the sharp point slightly inward and the hook point portion leading further inboard to a shank section.

Thus there is also provided a loop and a closure for the loop, the loop having a leading end and a trailing end, the trailing end having a slotted enlargement adapted to be disposed in straddling relationship over the leading end, the straddled leading end being slidable back into the enlargement to engage the enlargement to thereby, close the loop. Preferably, the leading end has a narrow section that passes through a slot in the enlargement and the enlargement has a corresponding shoulder that engages the narrow section to close the loop.

The point need not be employed and while the connector may be made in set sizes for particular applications, by placing relieved or wasted sections along the connector a variable type connector may be formed. One example has a zig-zag form with repeated inward and outward directed sections with each outward section of the zig-zag form having a relieved or wasted section which may engage the enlargement along the zig-zag to provide different sized closed loops depending on which section is used and connected to the enlargement.

In one form the enlargement is a slotted head and at least one wasted section is tapered so as to wedge in the slot, it being appreciated that the curved arrangement of the connector in its open position biases the head into wasted section and to the closed position. In another case at least one wasted section is an annular slot.

In another example the enlargement is a head having a recess around an opening, the wasted section having a shoulder including a leading face which when the loop is closed is in register with a back wall of the recess. Although this example has an annular slot it will be appreciated that there may be facing slots on opposite sides as in the previous embodiment rather than an continuous wasted region.

When the loop is closed it may have a regular curved form or be shaped, in one case the connector has bulged regions. In another the enlargement head has an inward radial section which serves a spacer function so that when the connector is closed useful gaps are formed between the connector and whatever it surrounds while the connector is a tight fit. The bulged regions may comprise at least one outward bulge and an inward bulge. Bulges may be positioned to aid single handed closure.

BRIEF DESCRIPTION OF THE DRAWINGS

In order that the present improvements may be more readily understood and put into practical effect reference will now be made to the accompanying drawings which illustrate preferred embodiments of the invention and wherein.

METHOD OF PERFORMANCE

Figure 1A:
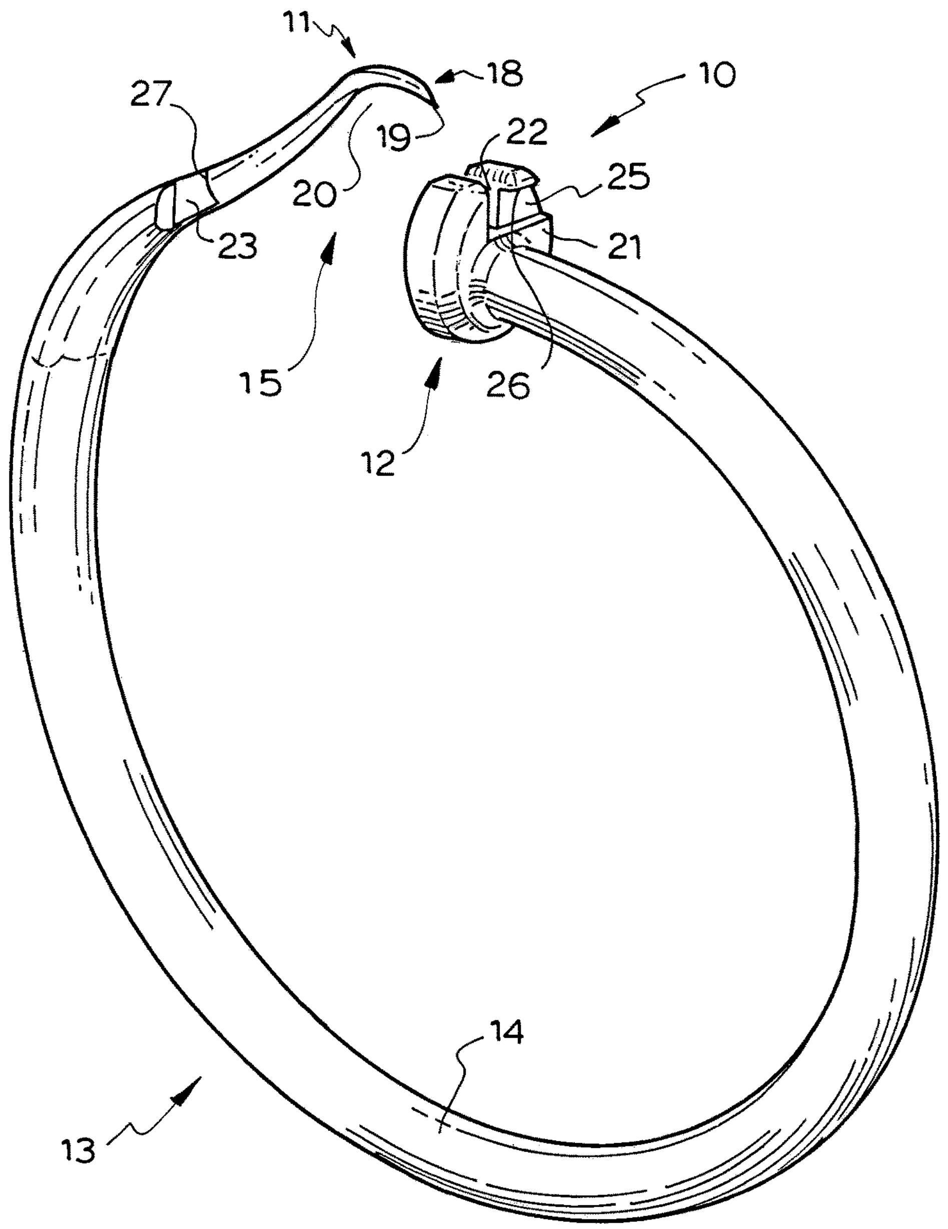
FIGS. 1A and 1B are enlarged perspective and top view drawings of one embodiment.
Figure 1B:
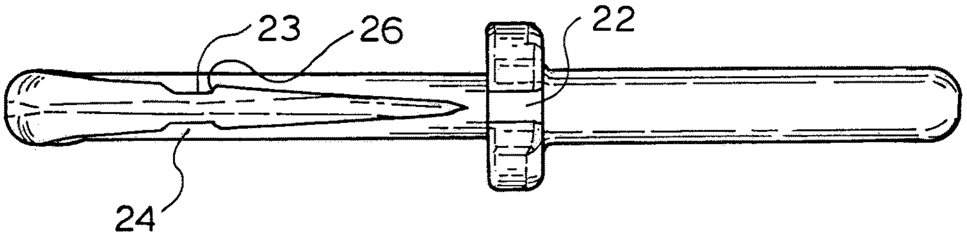

Referring to the drawings and initially to FIGS. 1A and 1B there is illustrated an open loop connector 10 (to enlarged scale) having a leading end 11 and a trailing end 12 joined by a loop body part 13. A user may hold the loop along the back 14 opposite the gap 15 and with a downward curved stroke in the direction of arrow 16, 17 (see FIGS. 2 and 3) in a form of hand motion move the leading end towards a vertical sheet material to penetrate the sheet material.

A hook point portion 18 includes a sharp point 19 with an inward curve 20 so that with the downward stroke the point 19, which is projecting out from the loop, catches the sheet and its curve gives it reentrant function through the sheet. That is, after the point 19 passes through, for example, a vertical sheet, then continuance of that hand motion, by reason of curve 30, the point 19 will become reentrant and automatically return back through the sheet.

Figure 2:
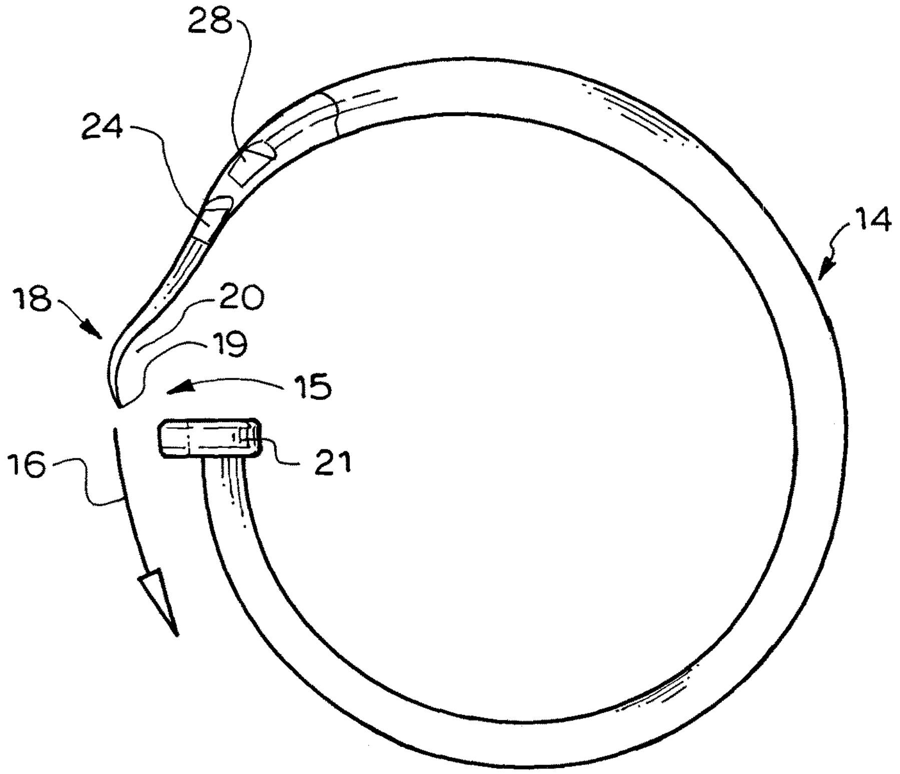
FIG. 2 is a side view of a second embodiment.
Figure 3:
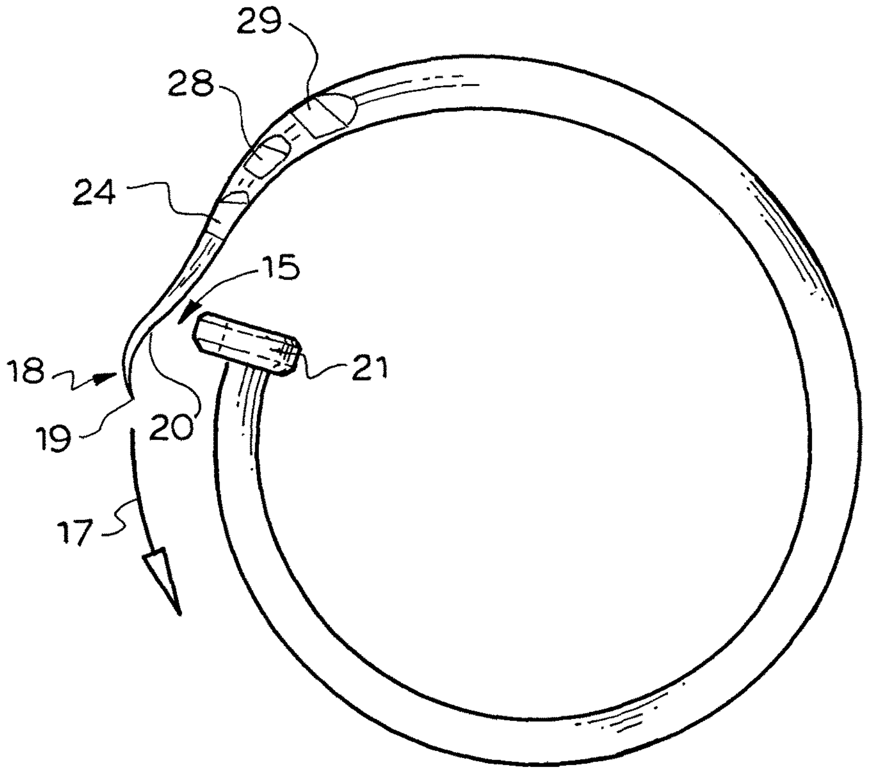
FIG. 3 is a side view of a third embodiment.

In FIG. 2 the point 19 is just adjacent the trailing end. In FIG. 3 the hook point portion overlaps the trailing end. The objective is for the point to be proud and exposed to catch. Usually the trailing end will ride along the sheet and a form of stroke and push will cause the point to catch. The point could be stuck in anything where one might like to connect or hang something. The loop need not be closed to function usefully. It could be free hanging. It could be closed and free hanging.

The trailing end 12 has an enlargement 21 which has a narrow slot 22. The hook point portion 18 faces the slot 22. The hook point portion 18 has an enlargement attachment as narrow outwardly facing relieved sections 23 and 24 matched to the slot 22 so that this narrow section may pass closely through the slot 22. The enlargement has an undercut 25 providing a shoulder 26 so that the hook portion may manually be extended to align the narrow relieved sections with the slot, the narrow section 23, 24 may then be pushed through the slot 22 and released back into the slot 22, the shoulder region 26 locks under shoulder 25 thereby closing the loop. The reverse process unlocks and opens the loop. By reason of the configuration of the hook, the curve of the loop and the slot 22, the back of the recesses 23 and 24 at 27 is inclined to the curved line of the loop. This aids entry into the slot 22.

Additional narrow sections 28, 29 may be used to form a tighter closed loop.

Figure 4:
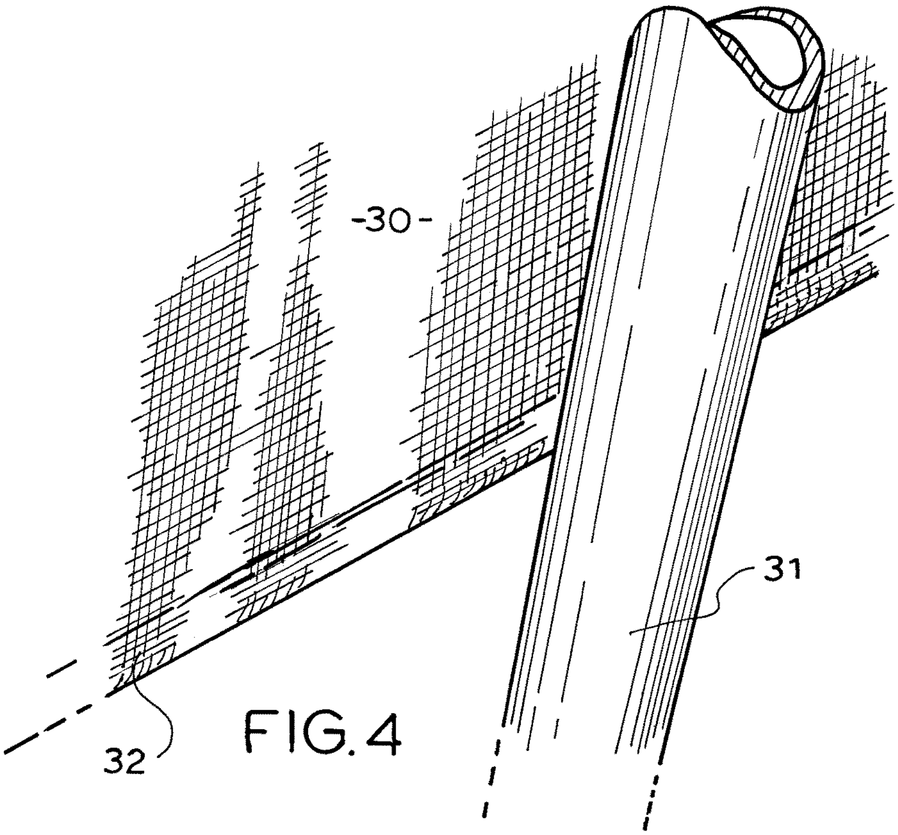
FIG. 4 is a drawing of a sheet adjacent a bar prior to connection to the bar using the present invention.
Figure 5:
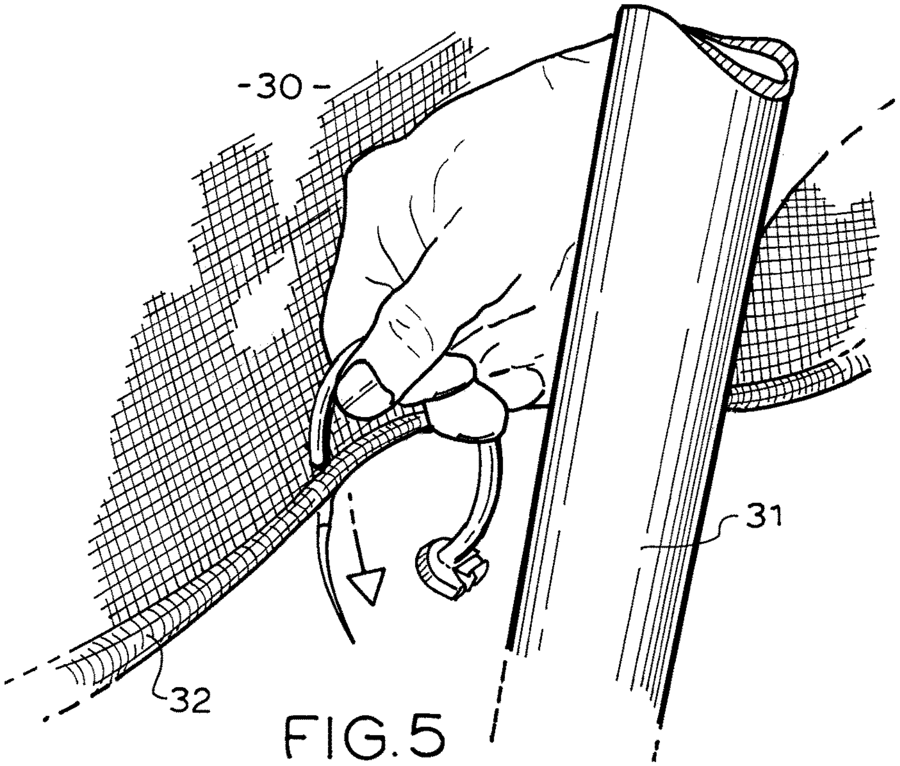
FIGS. 5 through 8 illustrate various manual operations for connecting the sheet of FIG. 4 to the bar using a loop connector according to the invention.
Figure 6:
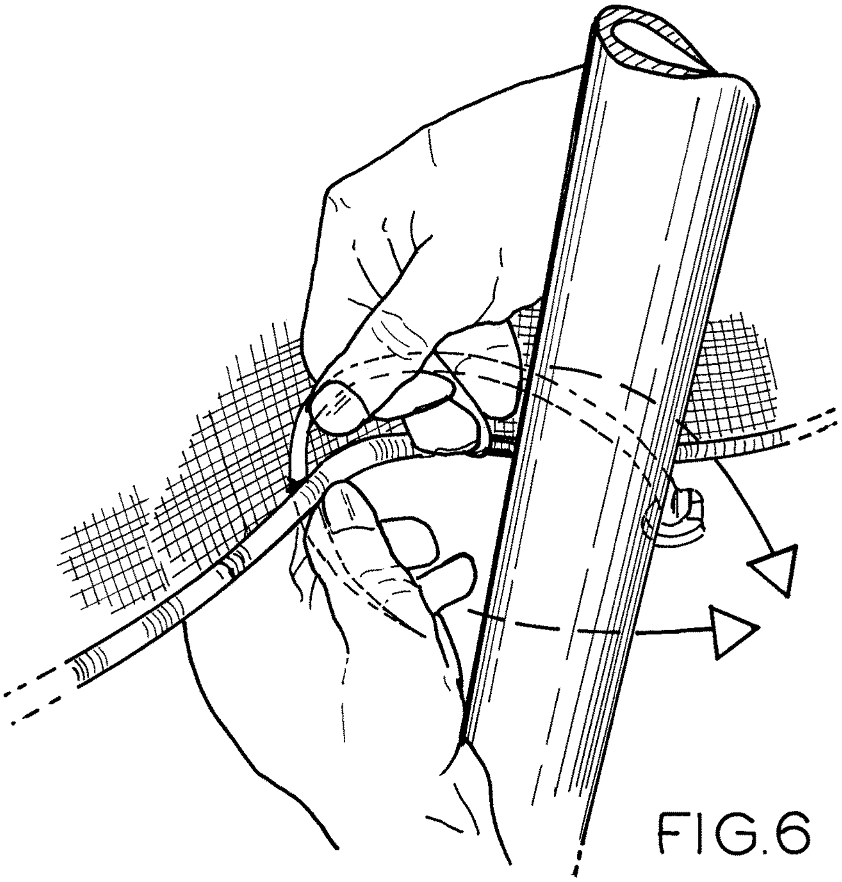

FIGS. 4-6 illustrate an application of the invention used to tie shade cloth 30 to a metal bar 31. In this case the shade cloth has a hem 32. As shown in FIG. 5, using a downward wrist action, the point 19 passes through the shade cloth in a general vertical direction, it is then twisted and manipulated in FIG. 6 through the horizontal so it may pass around the post to eventually be secured similar to FIG. 8. FIG. 6 shows the twisting and resilient bending that may be used to get the loop open widely and manipulated into a tricky situation.

Figure 7:
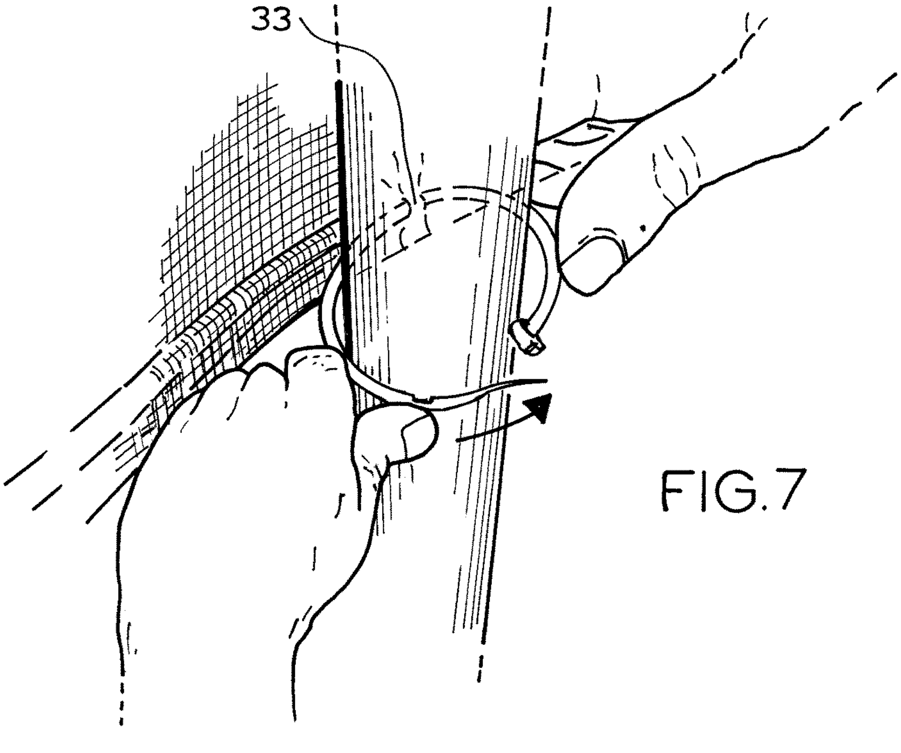
Figure 8:
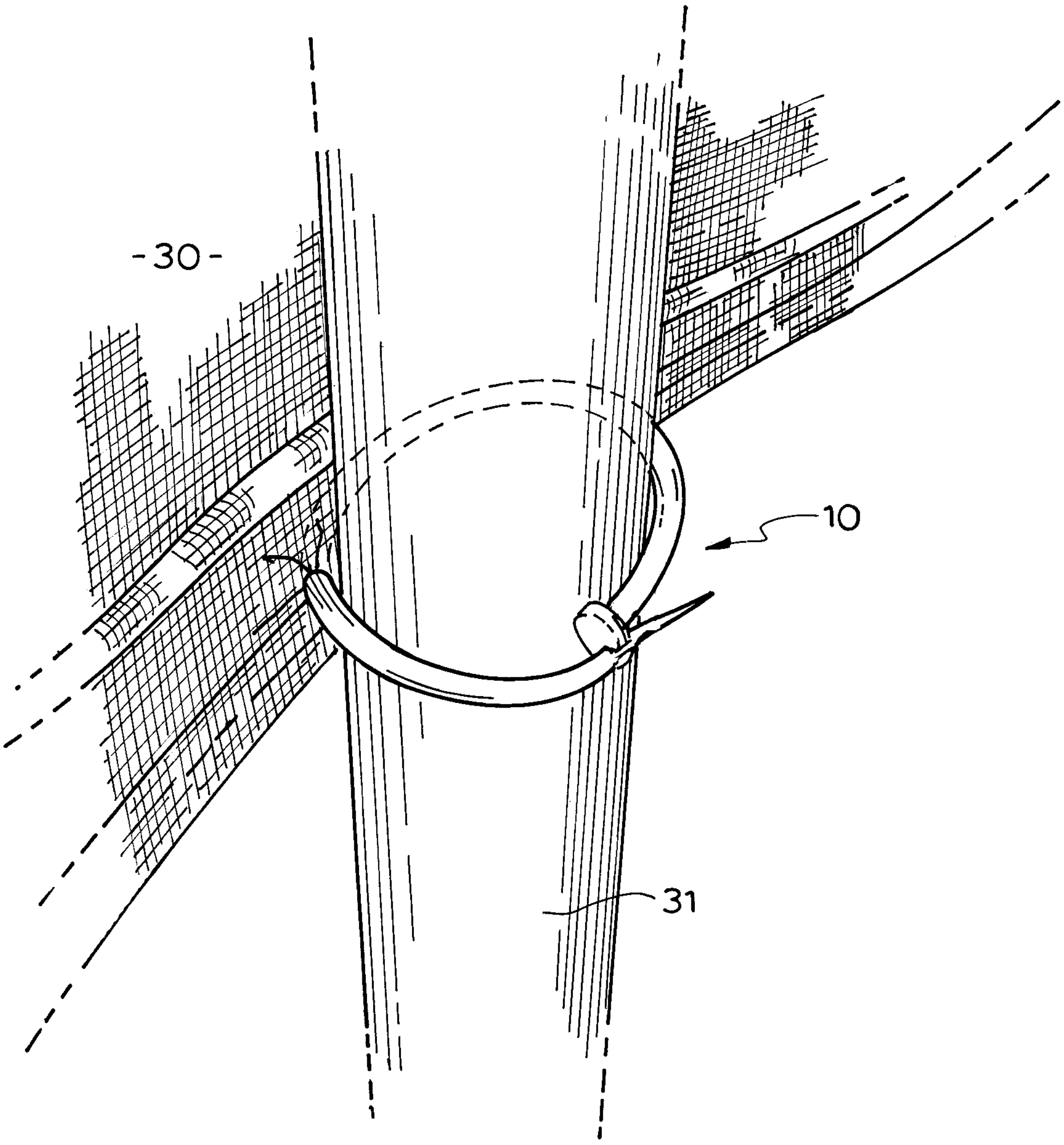

FIG. 7 shows in hidden detail at 33 where the point has been passed through the sheet and then back out using a horizontal hand motion and then clipped closed. FIG. 8 shows this final position.

Figure 9:
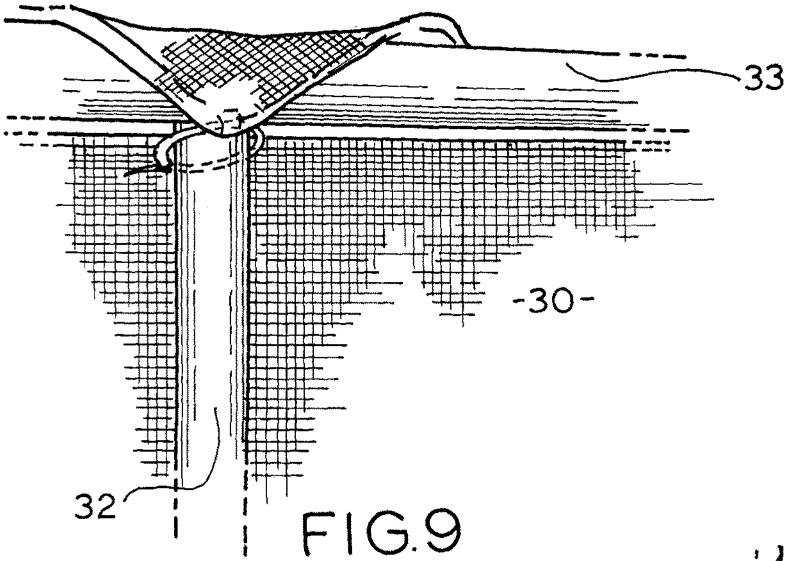
FIGS. 9 through 11 show further connection possibilities for sheet material.
Figure 10:
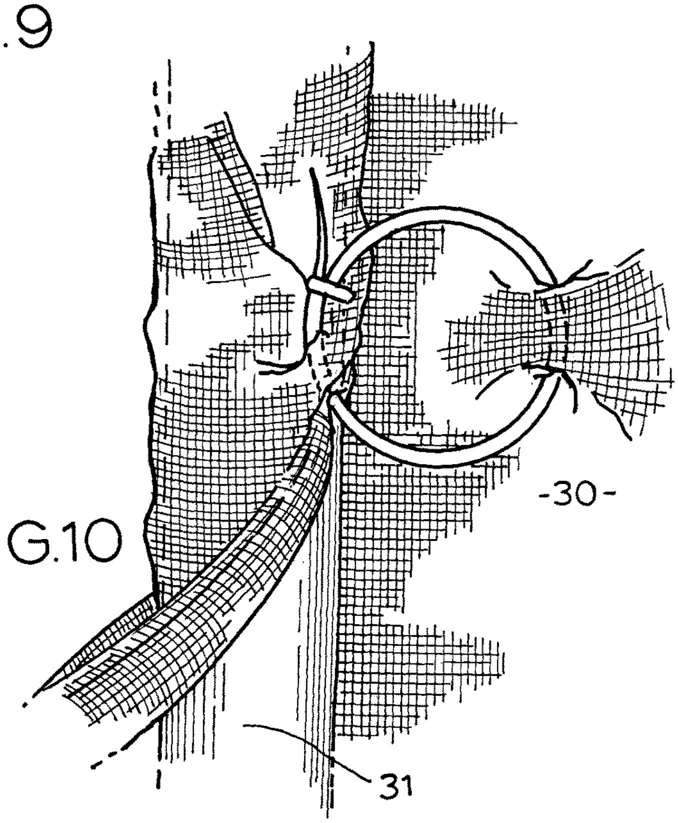
Figure 11:
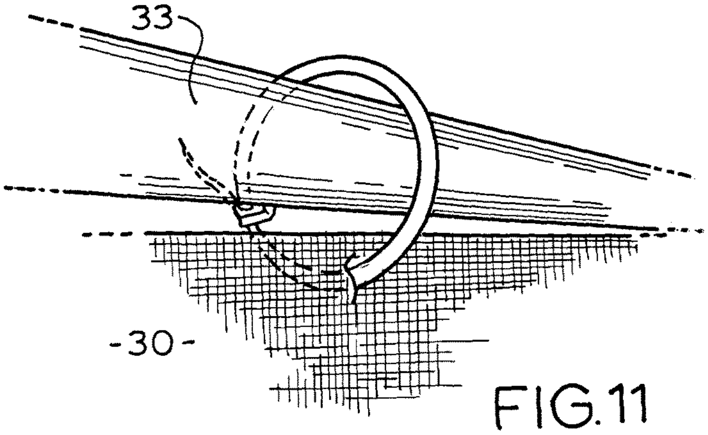

There are many possibilities, FIG. 9 shows a T-junction of pipes 32 and 33, FIG. 10 a wrap around configuration and FIG. 11 a horizontal pipe 33.

As illustrated in FIG. 11 the loop may be a loose fit or a tighter fit as in for example FIG. 8 depending on the relative dimensions or where it is being used. It may be simply used to suspend a hanging basket from a tree branch in a garden without having to use the point to penetrate. It may just loop over something or may connect two things together.

Figure 12:
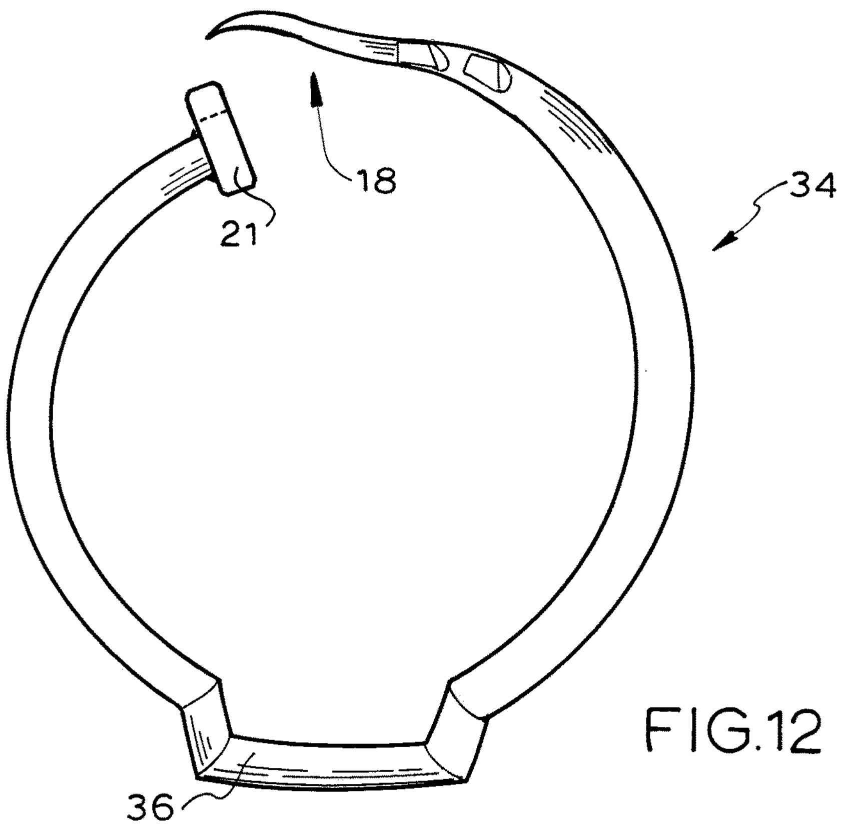
FIGS. 12 through 14 show further embodiments.
Figure 13:
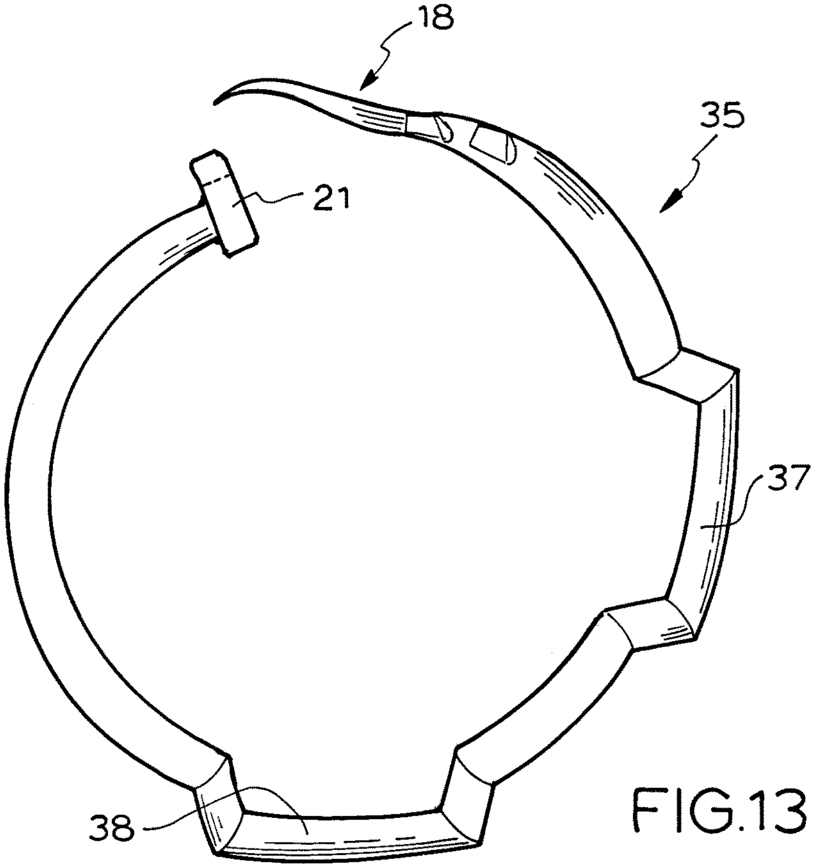

In some cases it may be desirable to provide a keeper function for leads, wires etc. subject to the dimensions leads may simply pass between inside the loop. (see FIG. 11). In other cases the keeper function might need to be a bit more specific. FIGS. 12 and 13 show loops 34 and 35 which have the same end configurations as the previous embodiments, except they have specific offset keeper portions 36, 37 and 38 so that when fitted these provide a passage to feed through leads, wires etc through so that the loop may provide a keeper function particularly in the case of a light fit. The position of these offset portions repetitive to the point and enlargement means that the keeper may be set opposite any sheet.

Figure 14:
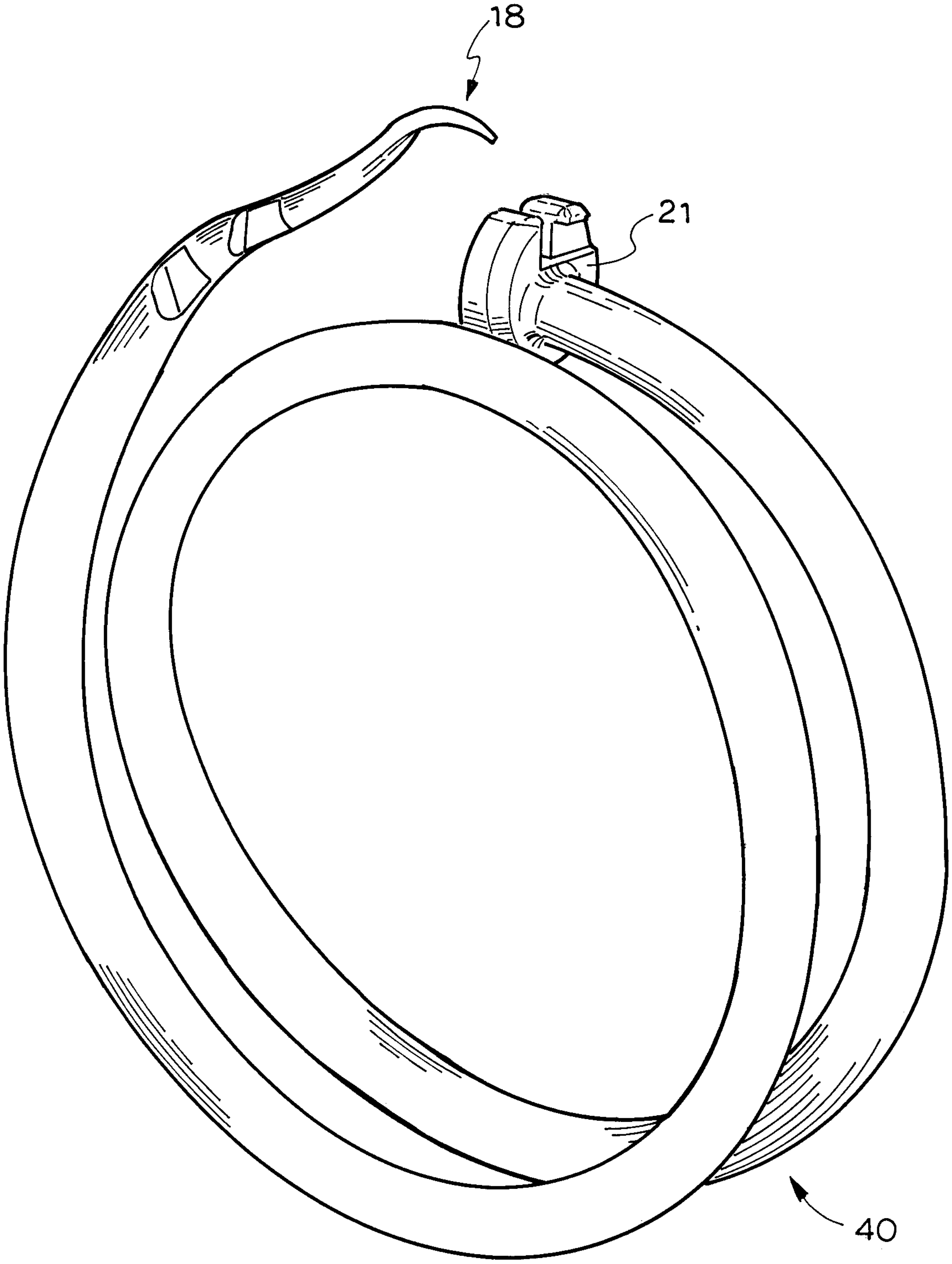

FIG. 14 illustrates a further embodiment 39 where part of the loop is in spiral form at 40 with the point portion drawn back past the spiral section to face the slot in enlargement 21.

Figure 15:
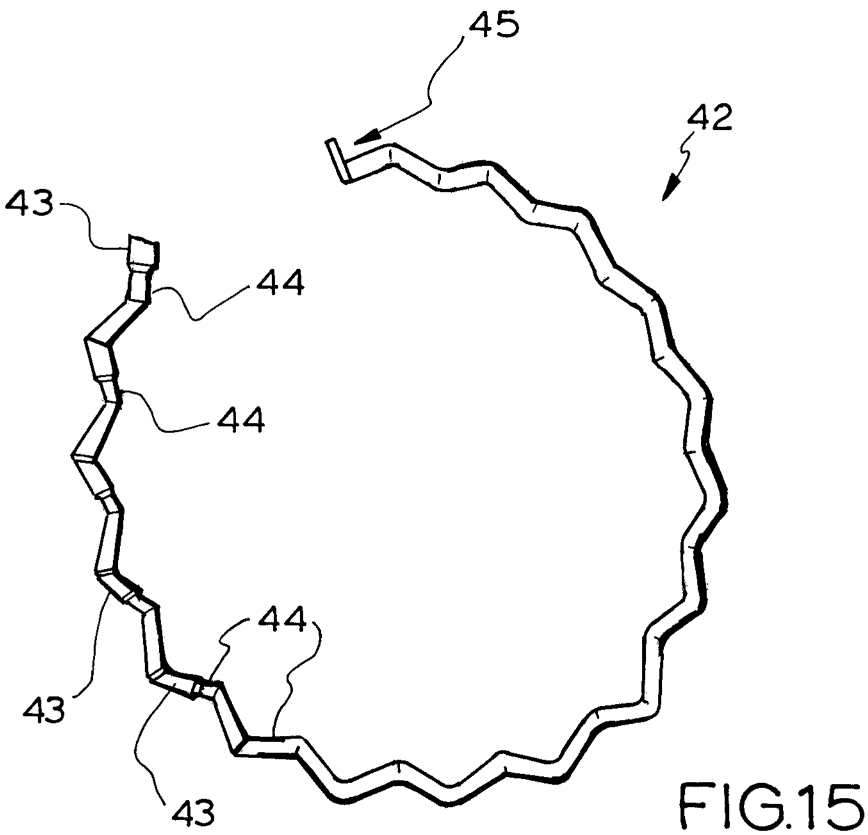
FIGS. 15 and 16 show another form where the connector has incremental adjustment for different sizes.
Figure 16:
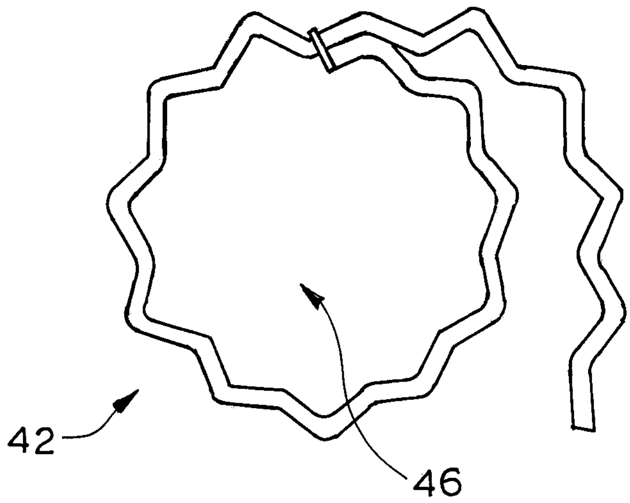

As described broadly above the point need not be employed and while the connector may be made in set sizes for particular applications, by placing wasted sections along the connector a variable type connector may be formed. The embodiment 42 of FIGS. 15 (open) and 16 (closed) is one example where the loop has a zig-zag form with each outward section 43 of the zig zag having a wasted section which may engage the head 45 along the zig-zag to provide different sized closed loops one being shown at 46 and in a spiral form. This may be used as a tie in many situations including building and construction, agricultural, boating, general household and any use where it is desirable to tie things. It has the advantage over cable ties in that it is releasable. In horticultural situations it may be used to adjust for growing vines or shifted from one location to another and so on. In FIGS. 15 and 16 the wasted sections have been omitted for clarity but demonstrate the exemplary form of the adjustable sized body. The wasted section of FIGS. 17-19C may be employed as for that matter may any attachment suited to the enlargement involved.

Figure 17:
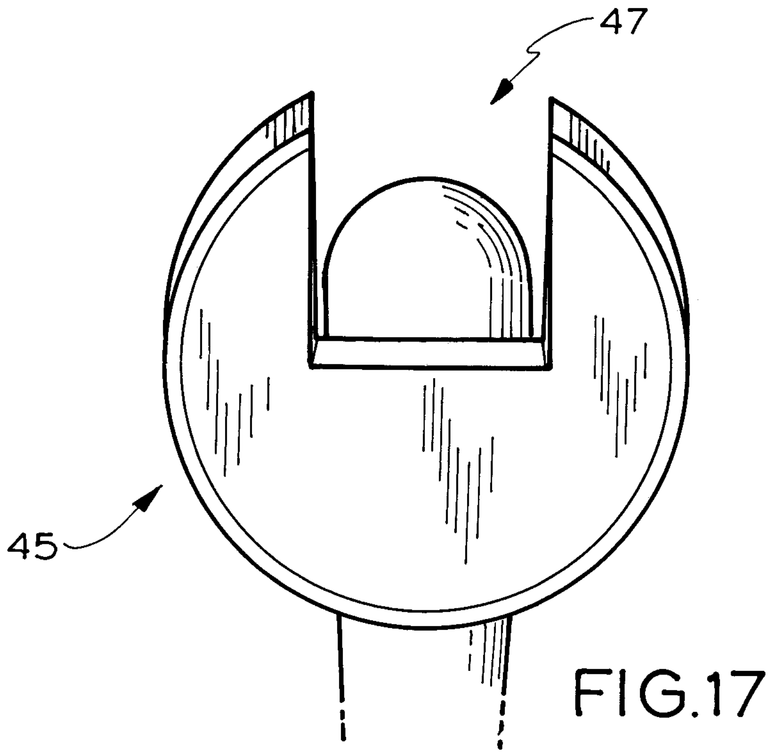
FIGS. 17 and 18 are part drawings of a head and its connection to a wasted section in the closed loop suitable for any arrangement and particularly to the arrangement of FIGS. 15 and 16.
Figure 18:
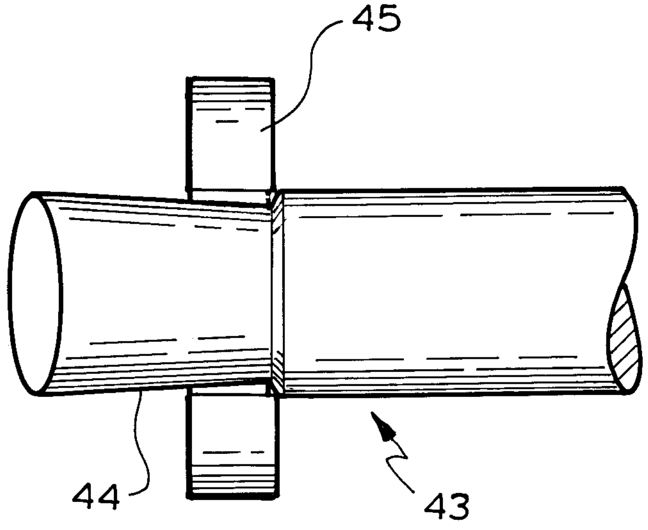

FIGS. 17 and 18 illustrate one example of a head 45 and wasted section 44 which in this case is tapered so as to wedge in the opening 47, it being appreciated that the curved arrangement of the connector in its open position biases the head into wasted section and to the closed position.

Figure 19A:
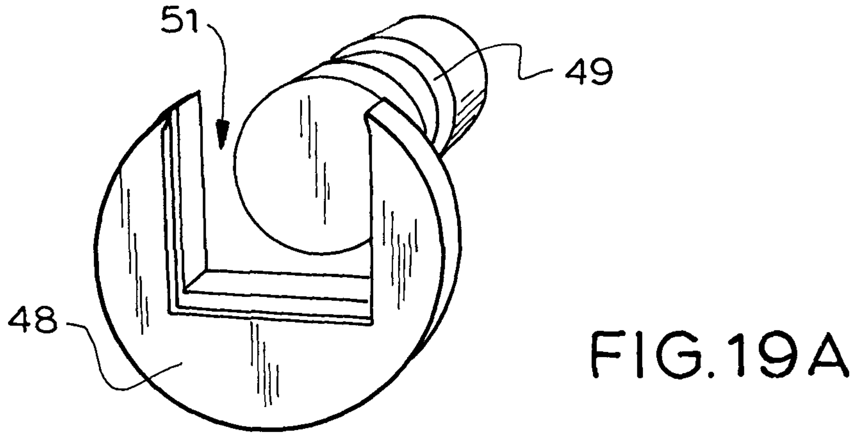
FIGS. 19A-19C are drawings of a head and its connection to a wasted section of another form.
Figure 19B:
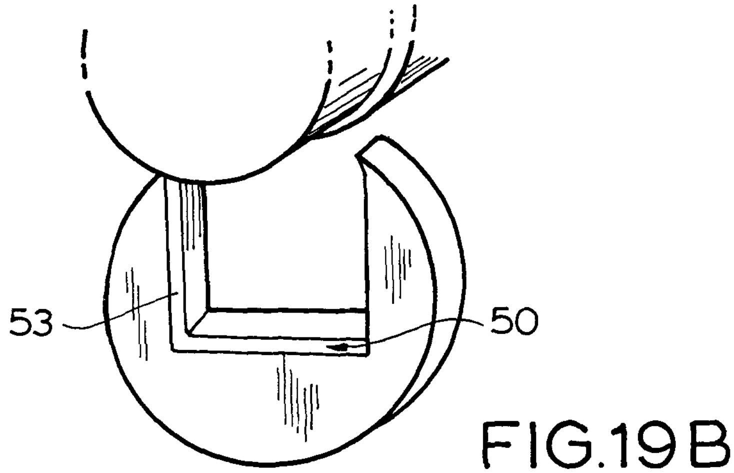
Figure 19C:
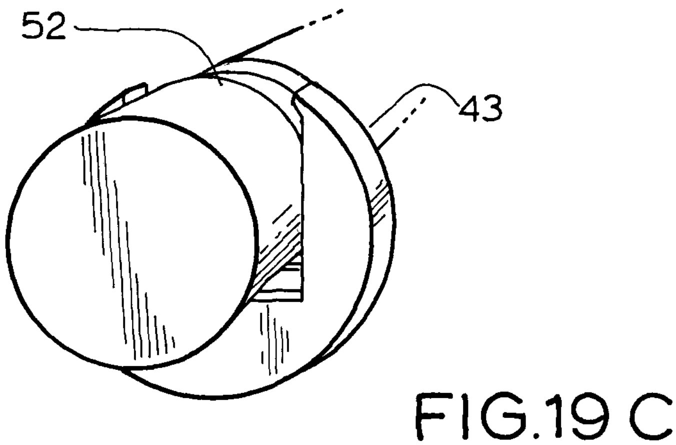

FIGS. 19A-19C illustrate a the stage where a head 48 engages an annular slot 49 wasted section, the head 48 has a recess 50 around the opening 51 so that the leading face 52 of the slot 49 is in register with the back wall 53 of the recess. Although this example has an annular slot it will be appreciated that there may be facing slots on opposite sides as in the previous embodiment rather than an continuous wasted region.

Figure 20:
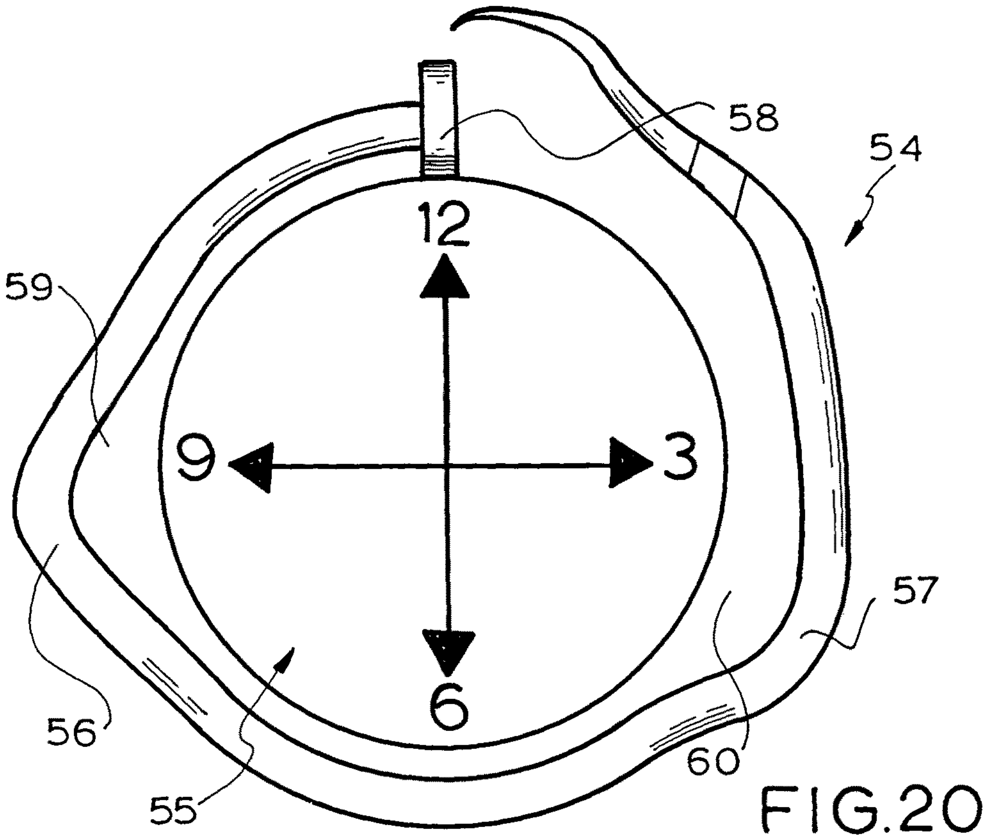
FIGS. 20 and 21 are further embodiments showing a bulged region forming useful gaps between the connector and an object.
Figure 21:
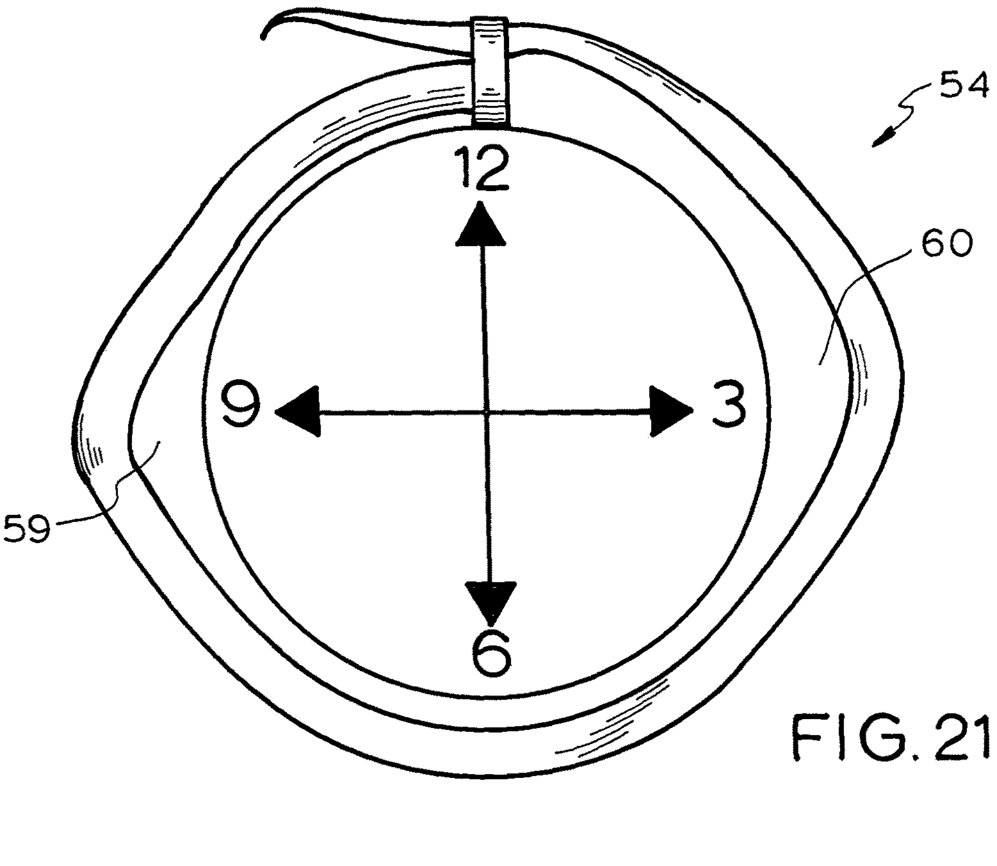

FIGS. 20 (open) and 21 (closed) show how other variations may be made, in this case the connector 54 is shown around a pipe 55, and has bulged regions 56 and 57, the head has an inward radial section 58 which serves a spacer function so that when the connector is closed useful gaps are formed at 59 and 60, typically, so that the connector may be used as say a caddy, to hold cabling or other along the pipe.

Figure 22A:
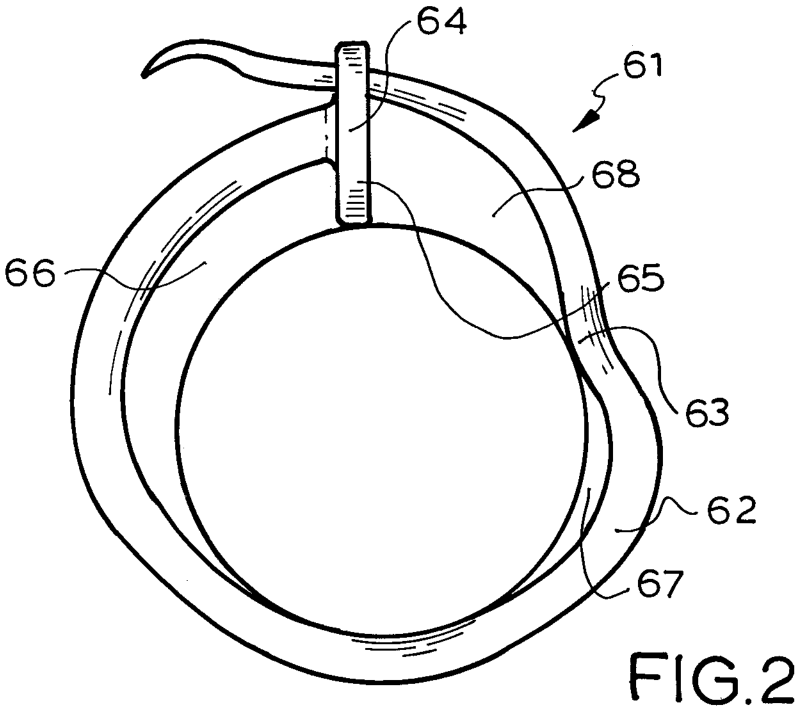
FIGS. 22A and 22B is another example where useful gaps may be formed.
Figure 22:
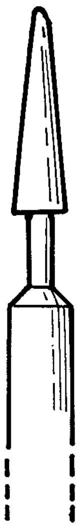

FIG. 22 is an example of a closed loop 61 showing an outward bulge, and inward bulge 63 and a head 64 having a 5*mm* inward spacer section 65, so this serves to illustrate the applications that may be envisaged depending on what the specific application, in this case there are three separate gaps 66, 67 and 68.

Figure 23:
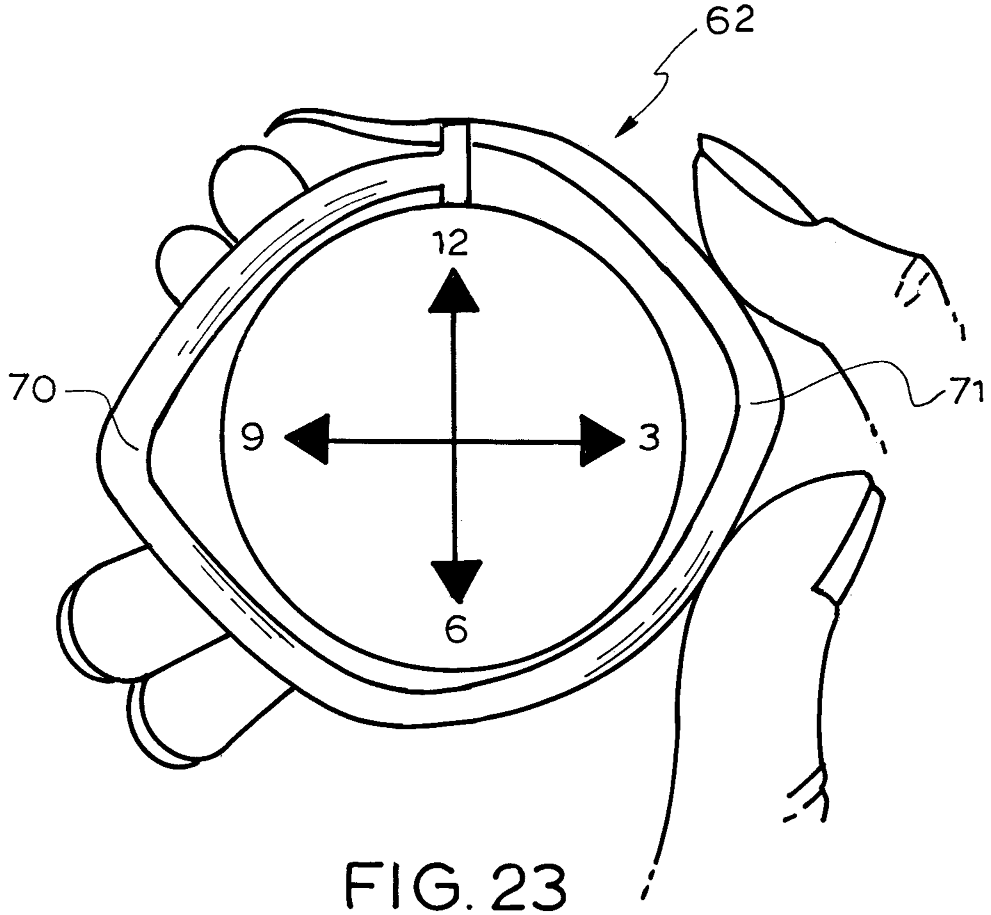
FIG. 23 is another form that has bulged regions that form useful gaps and also ease single handed operation.

Another aspect is shown in FIG. 23 where in this case there is a loop 69 being closed, the bulges 70 and 71 are set at 90 degrees relative to the connection of the head and wasted section so these bulges give purchase for single-handed closure as well as providing useful gaps.

It will be appreciated from the foregoing that the general principle of the invention is an open loop that may be manually closed by a closing process and be releasable by the reverse process.

Whilst the above has been given by way of illustrative example many variations and modifications will be apparent to those skilled in the art without departing from the broad ambit and scope of the invention as set out in the appended claims.

The invention claimed is:

1. An open loop connector formable from an open loop body having a self-holding open loop body configuration which resists closure into a closed loop by a connection comprising a first part being an enlargement and a second part comprising an enlargement attachment, the enlargement and the enlargement attachment provided on the open loop body and being engageable to form the connection between the enlargement and the enlargement attachment, the open loop body enclosing an open space and there being a center of the open space enclosed by the open loop body, the enlargement and the enlargement attachment being so dimensioned and arranged so that the enlargement and the enlargement attachment are radially offset in the open loop body configuration relative to a radius taken from a point at the center of the space enclosed by the open loop body to the open loop body and are manually moveable relative to one another with the enlargement attachment being moveable in a forward direction to a position over the enlargement, then in an inward direction down into the enlargement and then reversed to engage the enlargement and the enlargement attachment, wherein the engagement of the enlargement and the enlargement attachment form the connection such that at least a portion of the open loop body extends beyond the connection and is exposed in the forward direction; and wherein the open loop body has a leading end that extends beyond the connection, the leading end comprising a pointed end portion having a point and an inwardly directed arc configured such that, after passage of the pointed end portion through penetrable sheet material, continued movement of the open loop connector causes the pointed end portion to automatically return back through the sheet material in a re-entrant manner.

2. The open loop connector according to claim 1 wherein the leading end is movable to pass through a hole in vertical sheet material with a downward stroke so that with a continuance of the said downward stroke, the point, which is projecting out from the open loop body, catches the vertical sheet and be re-entrant through the sheet.

3. The open loop connector according to claim 1 wherein the leading end comprises a sharp hooked end which has an arc so that the leading end hooks back toward the enlargement.

4. The open loop connector according to claim 1 wherein the open loop body is non-circular in shape having the leading end and a trailing end, the enlargement being the trailing end, the enlargement attachment being inboard of the leading end, and having an outwardly facing shoulder, the enlargement defining a corresponding shoulder lockable behind the outwardly facing shoulder of the leading end to close the body to form the closed loop.

5. The open loop connector according to claim 1 wherein the enlargement comprises a slotted enlargement that is positionable in a straddling relationship over the enlargement attachment to engage the enlargement attachment to close the open loop body, and upon the closing of the open loop body, the engagement being reversible to reopen the open loop body.

6. The open loop connector according to claim 1 wherein the enlargement attachment has at least one outwardly facing relieved or wasted section, the enlargement having a gap, the relieved or wasted section being moveable under manual pressure to enter the gap such that the relieved or wasted section may pass through the gap and, upon retraction into the gap, engage the enlargement to releasably close the open loop body and form the connection.

7. The open loop connector according to claim 1, wherein, when in the self-holding open loop body configuration, the open loop body has the leading end and a trailing end in a neutral position, the leading end being-positioned on an approximate spiral outside and arcuately overlapping the trailing end, the leading end being spaced apart from the trailing end during passage of the leading end through sheet material.

8. The open loop connector according to claim 1 wherein the second part comprises a plurality of enlargement attachments that are spaced along the open loop body, each enlargement attachment being selectively connectable to the enlargement to vary the size of the closed loop.

9. The open loop connector according to claim 1 wherein the enlargement attachment comprises a plurality of enlargement attachments that are spaced along the open loop body, each enlargement attachment being selectively connectable to the enlargement to vary the size of the closed loop, the open loop body including inwardly directed sections and outwardly directed sections along the length of the open loop body.

10. The open loop connector according to claim 1 wherein the enlargement is a slotted head having a slot and the enlargement attachment is tapered to wedge in the slot.

11. The open loop connector according to claim 1 wherein the enlargement is a head having a recess around an opening, the recess having a back wall and the enlargement attachment is a wasted section having a shoulder including a leading face which, when the open loop body is closed, is in register with the back wall of the recess.

12. The open loop connector according to claim 1 wherein, when the open loop body is closed into a closed loop, the closed loop has a regular curved form or includes bulged regions.

* * * * *